United States Patent [19]
Aldworth et al.

[11] Patent Number: 5,199,426
[45] Date of Patent: Apr. 6, 1993

[54] AIRCRAFT AIRCREW G-RESPONSIVE VALVE SYSTEM FOR CONTROLLING BREATHING GAS AND SUIT-INFLATION

[75] Inventors: Alec J. Aldworth, Charmouth; James C. Foote, Halstock, both of England

[73] Assignee: Normalair-Garrett Holdings, Ltd., England

[21] Appl. No.: 584,037

[22] Filed: Sep. 18, 1990

[30] Foreign Application Priority Data

Sep. 21, 1989 [GB] United Kingdom ............... 8921344

[51] Int. Cl.⁵ .................. A62B 9/02; A62B 17/00; A61M 16/00; F16K 17/36
[52] U.S. Cl. ...................... 128/205.24; 128/202.11; 128/204.26; 128/204.29; 137/81.1
[58] Field of Search .............. 128/205.24, 204.29, 128/204.18, 205.26, 200.24, 201.28, 201.29, 202.11, 202.12, 204.26; 137/78.5, 81.1, 48, 223, 225; 251/61, 335.3

[56] References Cited

U.S. PATENT DOCUMENTS

| | | |
|---|---|---|
| 2,735,425 | 2/1956 | Wilkening ............... 128/201.28 |
| 2,824,557 | 2/1958 | Mejean et al. ........... 128/205.24 |
| 3,019,804 | 2/1962 | Miller, Jr. .............. 128/201.28 |
| 3,103,927 | 9/1963 | Henneman et al. ........ 128/205.24 |
| 3,720,501 | 3/1973 | Cramer et al. ........... 128/205.24 |
| 4,219,039 | 8/1980 | Jaggars ................... 137/38 |
| 4,230,097 | 10/1980 | Beaussant et al. ....... 128/1 A |
| 4,638,791 | 1/1987 | Krogh et al. ............ 128/204.23 |
| 4,928,682 | 5/1990 | Stevenson et al. ....... 128/202.26 |
| 5,007,893 | 4/1991 | Row ...................... 128/201.29 |
| 5,027,807 | 7/1991 | Wise et al. .............. 128/201.28 |

FOREIGN PATENT DOCUMENTS 0263677 4/1988 European Pat. Off. .
2051417 1/1981 United Kingdom .

OTHER PUBLICATIONS

"G-loc: taming the killer", *Flight International*, Mar. 28, 1987.

Primary Examiner—Edgar S. Burr
Assistant Examiner—K. L. Asher
Attorney, Agent, or Firm—Larson & Taylor

[57] ABSTRACT

Aircraft aircrew life support apparatus has a G-protection garment inflation pressure control valve disposed in a common body with a breathing demand regulator. Inflation pressure output by the garment inflation pressure control valve is ducted within the body to be directly applied as an operating force to a valve controlling outflow from a breathing-pressure control chamber of the regulator whereby positive pressure breathing obtains in the presence of G-load. The garment inflation pressure control valve comprises a pressure balanced valve adapted to be displaced against the bias of a spring in an opening direction by a pneumatic actuator. The pneumatic actuator is controlled by signals from an accelerometer sensing G-load for inflation of the garment when the aircrew member is subject to high G-load (typically in excess of 2G) and by signals from a cabin pressure sensor for inflation of the garment if the aircrew member is exposed to high altitude (typically in excess of 12000 metres). The pneumatic actuator is subject to feedback control responding to garment inflation pressure.

8 Claims, 2 Drawing Sheets

AIRCRAFT AIRCREW G-RESPONSIVE VALVE SYSTEM FOR CONTROLLING BREATHING GAS AND SUIT-INFLATION

BACKGROUND OF THE INVENTION

1. Field of the Invention

This invention relates to an aircraft aircrew life support apparatus and is particularly concerned with integrated breathing demand regulator and garment inflation pressure control systems.

2. Description of the Prior Art

The enhanced agility of modern high performance aircraft designs give such aircraft the ability to perform very highly accelerative manoeuvres both at low altitude and at high altitudes, e.g. in excess of 12000 meters (40000 ft). To take advantage of this agility an aircrew member flying the aircraft must be protected against G-induced loss of consciousness, known as G-loc, as well as the effect of increasing altitude. In this regard, unless otherwise specified, references to altitude are to be understood as references to the altitude equivalent to the pressure within an enclosure or cabin within which an aircrew member is situated and which is usually pressurised in relation to the external ambient pressure with the consequence that "cabin altitude" is related to but usually less than the actual altitude of the aircraft.

The partial pressure of oxygen in air decreases with increasing altitude (decreasing total pressure) so that the concentration of oxygen in breathing gas supplied to the aircraft aircrew member must be increased with increasing cabin altitude to maintain the oxygen partial pressure above the minimum value necessary for it to be able to diffuse through the lung tissue and pass to the haemoglobin or red corpuscles in the blood. If at aircraft operating altitudes above 12000 meters there is total or partial loss of cabin pressurisation or for other reasons the cabin altitude exceeds 12000 meters, the overall pressure of the breathing gas delivered to the aircrew member must be increased to a value above cabin ambient pressure so that the minimum critical oxygen pressure is maintained in the lungs, this being referred to as positive pressure breathing (PPB).

Positive pressure breathing at high altitude is aided by exerting pressure around the chest to assist the aircrew member in exhaling used gas from his lungs against the positive pressure in his breathing mask. To meet this requirement the aircrew member wears an inflatable counter-pressure garment ("jerkin") around his chest and back area which is inflated to the same pressure as the pressure in the breathing mask during positive pressure breathing, conveniently by being connected for inflation by breathing gas delivered to the breathing mask.

The effects on an aircrew member of high G-load experienced when performing high speed turning manoeuvres are well appreciated. The problem of G-loc is described in an article entitled "G-loc: taming the killer" by Mr. Mike Gaines which appeared at pages 27 to 30 of the Mar. 28, 1987 edition of "FLIGHT INTERNATIONAL".

To counter the effects of high G-load the aircrew member wears an inflatable G-protection trouser garment ("G-suit") which is inflated from a source of high pressure gas, such as engine bleed air, in response to signals from one or more accelerometers located in the aircraft for sensing accelerative forces. When inflated, the trouser garment restricts the flow of blood into the lower extremeties of the body where it tends to be forced under the action of the G-load to which the aircrew member is subjected.

It has been found that protection against G-loc is further enhanced by providing positive pressure breathing during periods when high G-loads are being experienced. The increase in breathing pressure causes an approximately equal increase in heart level blood pressure thereby increasing the flow of blood to the brain.

At altitudes which demand positive pressure breathing it is advantageous to inflate the trouser garment to a pressure approximately four times that of the pressure in the breathing mask even at times when aircraft flight maneouvres are not such as to give rise to high G-load. This inflation of the trouser garment counteracts the tendency for blood to be forced into the lower extremities of the body by the high pressure in the lungs, to reduce the circulation of blood from the heart to the brain. However, when both altitude and G-load conditions give rise to a requirement for positive pressure breathing, the trouser garment should be inflated to the higher one of the pressure requirements for protection against the prevailing G-load and exposure to high altitude.

It is common practice now to provide oxygen-enriched air as breathing gas for an aircrew member of a high performance aircraft from an on-board oxygen generating system (OBOGS) which includes molecular sieve beds comprising zeolite material suited to the retention of nitrogen whilst permitting oxygen to pass through the beds.

A problem with respect to demand valve operation in a breathing regulator suitable for accommodating the lower range of breathing gas pressure available from an OBOGS is overcome by a breathing regulator disclosed in EP-A-0 263 677 (Normalair-Garrett) which provides positive pressure breathing when the cabin altitude exceeds 12000 meters and, also, when high G-loads are being experienced. Above 12000 meters cabin altitude, an aneroid valve expands to increasingly restrict the flow of gas from a breathing-pressure control chamber so that pressure in this control chamber increases thereby increasing the pressure of the breathing gas at the regulator outlet to which both breathing mask and counter-pressure garment or jerkin are connected.

When the aircrew member is subjected to high G-loads, i.e. between 3.5 G and 9 G, a further valve regulating outflow from the breathing-pressure control chamber is signalled pneumatically by an anti-G valve to move towards increasingly restricting outflow of gas from the breathing-pressure control chamber so that pressure in that chamber increases to provide (increased) positive pressure breathing in the event that the cabin altitude is below that at which the same degree of positive pressure breathing would be provided. The anti-G valve is an electro-pneumo-mechanical device that controls a supply of inflation air to the G-suit in accordance with sensed G-loads and the signal to the further valve of the demand regulator is obtained by tapping the inflation air line from the anti-G valve to the G-suit.

Further disclosures of aircraft aircrew life support systems and apparatus which control inflation of a G-protection garment worn by the aircrew member and regulate delivery of breathing gas in accordance with the breathing demands of the aircrew member are to be found in U.S. patent application Ser. No. 4,230,097

(Intertechnique), U.S. patent application Ser. No. 4,638,791 (Boeing) and GB-A-2,051,417 (Intertechnique), this last disclosing a unitary or integrated breathing demand regulator and G-suit inflation control valve in which, however, the demand regulator and the control valve are functionally separate.

The prior art systems (other than EP-A-0,263,677) such as above discussed treat breathing gas and jerkin pressure requirements and G-suit inflation pressure requirements as separate functions to be provided by individual sub-systems integrated, functionally, only to the extent of sharing input data (such as anticipated and/or realised G-loads) output by a common source. There is therefore a need for greater functional integration of such sub-systems to provide better control and coordination of their respective functions and, especially to provide optimised responses to abrupt changes in aircraft flight conditions. Additionally there is the need, common in aircraft equipment, to minimise the weight and space requirements of equipment, especially cockpit equipment having close proximity to aircrew members. EP-A-0,263,677 partly meets the need for functional integration but has potential shortcomings in practice.

SUMMARY OF THE INVENTION

It is therefore an object of the present invention further to improve upon the system of EP-A-0,263,677 and to provide an aircraft aircrew member life support system having a high rate of response in enhancing protection of the aircrew member against rapidly increasing and high G-load, and against exposure to high altitude, typically in excess of 12000 meters.

It is another object of the invention to provide apparatus for regulating delivery of breathing gas and for controlling G-protection garment inflation pressure in a single integrated unit which is particularly suited for use in an aircraft aircrew life support system embodying an on-board oxygen generating system.

It is a further object of the invention to provide aircraft seat-mountable breathing demand regulator and G-protection garment inflation pressure control apparatus in a single integrated unit having means for releasably connecting a personal equipment connector carried by an aircrew member to outlets of the apparatus.

Accordingly, the present invention provides an aircraft aircrew life support system comprising a breathing demand regulator means adapted to be connected with a breathing gas source for regulating delivery of breathing gas to a breathing mask in response to breathing demands of the aircrew member, and, if required, to a counter-pressure garment, the demand regulator including a breathing-pressure control chamber fed with gas to develop a control pressure therein determining the breathing gas pressure delivered by the regulator, aneroid means controlling outflow from the control chamber for increasing breathing gas delivery pressure appropriate to positive pressure breathing above a predetermined altitude, and valve means also controlling outflow from the control chamber for increasing breathing gas delivery pressure appropriate to positive pressure breathing in the presence of high or rapidly changing G-load; an anti-G valve and G-protection garment inflation pressure control means responsive thereto for outputting inflation gas to a G-protection garment and to said valve means controlling outflow from the control chamber, characterised by the G-protection garment control means being disposed in a common housing with the demand regulator components, the inflation pressure output by the control means being ducted within the housing to be directly applied as an operating force to the said valve means, and the G-protection garment control means comprising a spring-biased pressure-balanced valve adapted to be displaced, against the spring bias, in an opening direction by a pneumatic actuator.

The pneumatic actuator is preferably electrically controlled by signals derived, e.g., from an accelerometer sensing G-loads and a pressure transducer sensing aircraft cabin pressure The pneumatic actuator is desirably subject to feedback control responding to G-protection garment inflation pressure: this feedback control may be pneumatic, by direct application of the inflation pressure to the actuator, or as is preferred when the actuator is electrically controlled, the feedback control may be electrical and by signals derived by a suitable pressure transducer sensing the inflation pressure.

Desirably this pressure transducer is located in a chamber subject to the inflation pressure but isolated from the flow of inflation gas, to prevent turbulence effects degrading pressure signals output by the transducer. In preferred embodiments means are provided to smooth the flow of inflation gas in its flow path adjacent to a connection to said chamber, further to minimise perturbations in the pressure sensed by the transducer. In one embodiment the gas flow smoothing means comprise a cap supported by a cup spider in the housing and a tapered sleeve on the end of the balanced valve, the cap and the tapered sleeve having a telescoping relationship to each other and enclosing with the balanced valve the valve biasing spring, whereby the flow of inflation gas is smoothed in its flow path in the vicinity of the end of the balanced valve and irregularities and turbulence caused by sudden changes in cross-sectional area and flow over an exposed spring are avoided.

A vent valve for releasing inflation gas when deflation of the G-protection garment is required is preferably provided within the housing and connected to the inflation gas flow path downstream of the pressure-balanced valve of the G-protection garment control means so that the pressure-balanced valve is effectively isolated from the flow of inflation gas released by the vent valve, whereby contaminants carried in such gas flow cannot enter the pressure-balanced valve mechanism to interfere therewith.

In preferred embodiments, electrical control means for the pneumatic actuator comprise a torque motor controlling a pilot valve system and actuated by a digital controller to provide high speed proportional pilot valve motion.

In accordance with a further feature of the invention, the G-protection garment control means may provide for priming the garment by low pressure inflation thereof when protection against G-loads is not required but may be anticipated. Priming the garment in this way provides for an enhanced rate of response to a demand for full inflation signalled by the abrupt onset of a high G-load.

G-protection garment priming can also be accomplished in response to increasing altitude to provide for appropriate inflation of the garment when the demand regulator provides positive pressure breathing.

Preferred embodiments of the invention also provide facilities for testing the operation of the system and the proper fit and functioning of a breathing mask, counter-pressure jerkin and G-protection garment in a single operation.

Moreover, preferred embodiments of the invention incorporate the demand regulator and the G-protection garment control means in a single seat-mountable unit having outlets for breathing gas and G-protection garment inflation gas and adapted for cooperation with a personal equipment connector means carried by an aircrew member and having inlets associable with said outlets.

BRIEF DESCRIPTION OF THE DRAWINGS

A typical embodiment of the invention is illustrated in the accompanying drawings, in which.

DETAILED DESCRIPTION OF THE DRAWINGS

Figure 1:
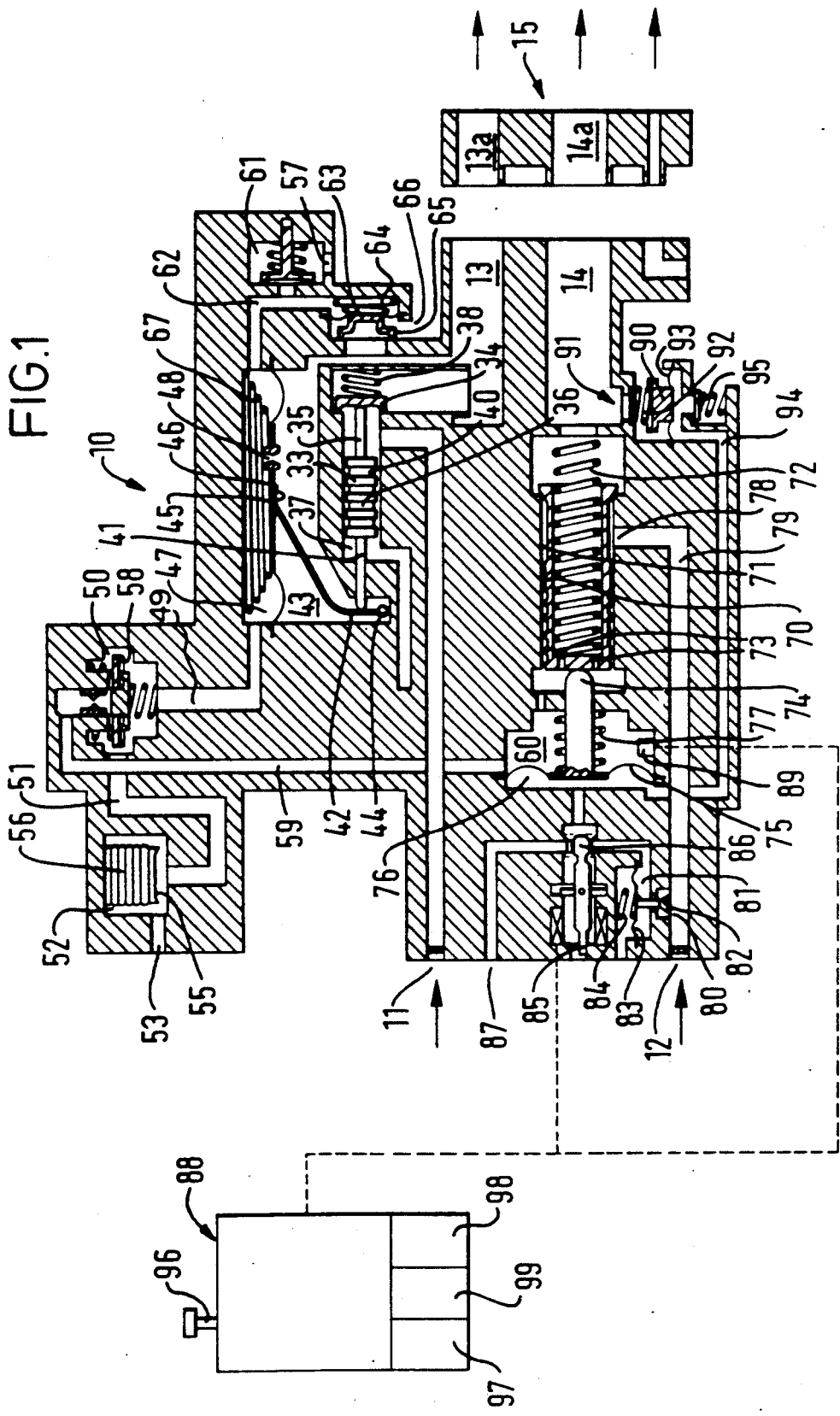
FIG. 1 is a schematic representation of the embodiment to illustrate the principles thereof.
Figure 2:
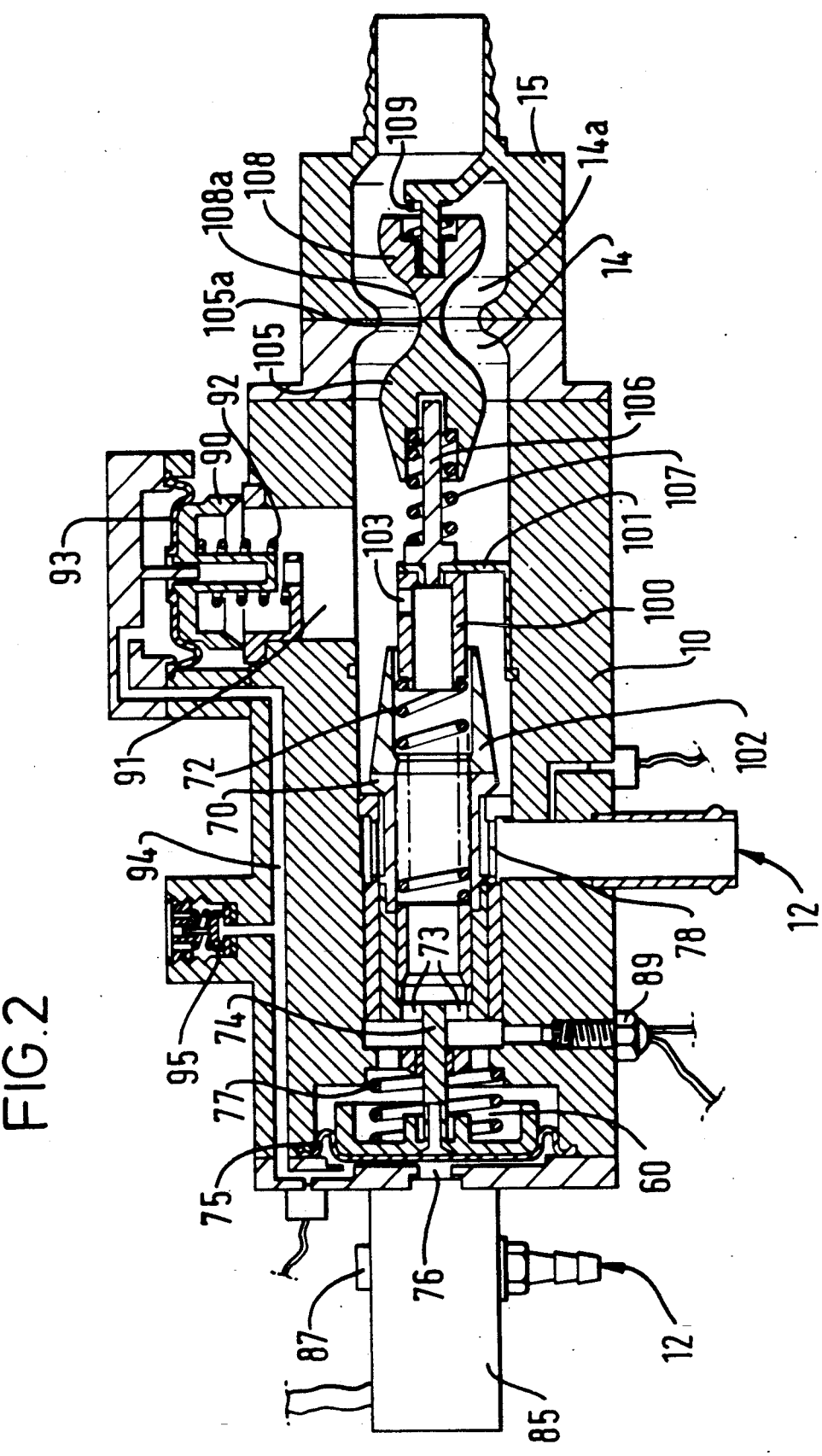
FIG. 2 illustrates the preferred construction of the G-protection garment inflation control means.

FIG. 1 of the drawings illustrates diagrammatically a combined demand regulator and G-protection garment control means in the form of a single seat-mountable unit 10 having a breathing gas inlet 11 and a G-protection garment inflation gas inlet 12, and outlets 13 and 14 for breathing gas and inflation gas, respectively, adapted for cooperation with corresponding inlets 13a, 14a of a personal equipment connector 15. The actual construction of the cooperating parts of the unit 10 and personal equipment connector 15 are not detailed in FIG. 1 because they conform with existing standards. For instance, as is customary, the outlets 13, 14 and inlets 13a, 14a incorporate self-sealing valve arrangements that provide open communication through the outlets and complementary inlets when the connector 15 is attached to the unit 10, but which close to seal off the outlets and inlets upon detachment of the connector 15 from the unit. FIG. 2 shows the self-sealing valve arrangement for the outlet 14/inlet 14a combination. Moreover, and as diagrammatically indicated in FIG. 1, the cooperating parts of the unit 10 and connector 15 include provision for coupling communications and other services, such as de-misting air supplies, on the aircraft to the aircrew member and his personal equipment. The connector 15 may also include a suitable tapping from the inlet 13a for connection to a counter-pressure garment ("jerkin") to provide for inflation of this by breathing gas to assist exhalation during positive pressure breathing.

The breathing gas inlet 11 is adapted to receive oxygen-enriched air from a molecular sieve oxygen-generating system (not shown). Flow of oxygen-enriched air to the breathing gas outlet 13 is controlled by a demand-regulator arrangement comprising a demand valve 33 having a valve head 34 supported by a spindle 35 from a spool 36 that slides in a bore 37 in the body of the unit 10. The valve head 34 is urged towards a closing position by a compression spring 38 acting on the valve head. Means such as an adjustment screw (not shown) may be provided for adjusting the thrust of the spring on the valve head. The opposed surface areas of the valve head 34 and the spool 36 are equal so that the valve 33 is balanced by the pressure of the oxygen-enriched air entering the inlet 11. The spool 36 is provided on its circumferential surface with grooves 40 in the manner of a labyrinth seal and a second spindle 41 projects from the end surface of the spool opposite the end surface from which a spindle 35 projects. The end of the spindle 41 contacts a valve operating lever 42 housed in a demand-pressure sensing chamber 43 and arranged to rock about one of its ends 44. The other end 45 of the lever 42 bears on the centre of a diaphragm 46 that divides the demand-pressure sensing chamber 43 from a breathing-pressure control chamber 47.

The demand-pressure sensing chamber 43 is arranged to be open to pressure at the outlet 13 whilst the breathing-pressure control chamber 47 is arranged to receive a bleed of oxygen-enriched air from the demand-pressure sensing chamber through an orifice 48 in the diaphragm 46. The breathing-pressure control chamber 47 is arranged to be open to aircraft cabin pressure by way of a passageway 49, a chamber 50, a passageway 51, a chamber 52 and an outlet passage 53.

The chamber 52 houses a valve head 55 carried by an aneroid capsule 56 and adapted for closing the entry from the passageway 51 into the chamber 52 whereby the pressure in the breathing-pressure control chamber 47 may be controlled in relation to cabin altitude.

The chamber 50 houses a valve 58 that is connected by a passageway 59 to a pressure-sensing chamber 60 of the G-protection garment control means of the unit 10, so as to receive pneumatic signals for control of the valve 58 to throttle passage of oxygen-enriched air to the chamber 52 from the breathing-pressure control chamber 47.

A maximum pressure relief valve 61 provides for venting of excess pressure from the breathing-pressure control chamber 47, via a passageway 62 and a vent 57, to the aircraft cabin.

A vent 66 to aircraft cabin communicates with the regulator outlet 13 and is closed by a valve head 65 carried by a diaphragm 63. The valve head is loaded by a spring 64 to contain a safety pressure in the outlet 13. During positive pressure breathing, pressure in the breathing-pressure control chamber 47 is applied, by way of the passageway 62, to the opposite side of the diaphragm 63 to which the valve head 65 is attached to further urge the valve head closed and thus prevents oxygen-enriched air in the outlet 13 being vented to the aircraft cabin unless the pressure in the outlet becomes excessive. The valve head 65 is arranged to open when the pressure in the outlet 13 is a prescribed amount higher than that in the breathing pressure control chamber 47. Typically, the pressure differential required to open this pressure relief valve arrangement is 125 Pa (0.5 inches/WG).

The diaphragm 46 is backed by a spring 67 located in the breathing-pressure control chamber 47. This spring acts on the diaphragm to urge it into contact with the lever 42 and the arrangement is such that the force balance of the springs 38 and 67 acting on the diaphragm 46 and demand valve 33 provides a null position for the diaphragm in which the valve head 34 is held off its seat sufficiently to maintain, in operation, a positive (safety) pressure of, say, 250 Pa (1 inch/WG) in the outlet 13. Means (not shown) may be provided to negate the effort of spring 67 when the regulator is out of use, to prevent wastage of oxygen-enriched air by permitting the valve head 34 close under the influence of spring 38.

As thus far described the demand regulator arrangement conforms in principle to the demand regulator described in EP-A-0 263 677, and functions in a similar manner. That is, with oxygen-enriched air available at the inlet 11, the demand valve 33 responds, by movement of the diaphragm 46, to phases of the breathing of an aircrew member wearing a mask attached to the outlet 13 via the connector 15. Breathing cycle pressure exists in the outlet 13 and thus in the demand pressure sensing chamber 43, being sensed by the diaphragm. This moves downwards, as seen in the drawing, during inhalation so as to cause opening movement of the valve 33, whereas exhalation causes the diaphragm to move upwards to permit the valve 33 to close.

Oxygen-enriched air bleeds though the orifice 48 to the breathing-pressure control chamber 47 and escapes therefrom by way of the passageway 49, chamber 50, passageway 51, chamber 52, and outlet passage 53. However, if cabin altitude increases (decreasing ambient pressure) above, say, 12000 meters (40000 feet) the aneroid capsule 56 expands to move the valve head 55 towards increasing the restriction to outflow from the chamber 47 to the outlet passage 53. This causes pressure in the chamber 47 to rise and increase the loading of the diaphragm 46 for any given pressure in the outlet 13 and chamber 43. The demand valve 33 thus tends to maintain an increased pressure in the outlet 13 and, hence, in the breathing mask of the aircrew member. The increase in pressure in chamber 47 is also applied to the diaphragm 63 of the relief valve arrangement.

In similar manner, when increasing G-load is applied to the aircraft and pressure in the chamber 60 is increased in the manner to be described, the valve 58 in the chamber 50 is caused to restrict the flow path from the chamber 47 to the outlet passage 53 and so result in a raising of the breathing gas pressure at outlet 13, thereby to assist breathing effort of the aircrew member during conditions of increased G-load.

For the reasons explained in EP-A-0 263 677, the valve 58 is preferably constructed to have a supplemental bleed flow facility effective to counteract the effects of sudden changes in a G-load.

The unit 10 additionally comprises G-protection garment control means that comprises a pressure-balanced spool valve 70 that moves in a bore 71 in the body of the unit 10 to control the flow of inflation gas from the inlet 12 to the outlet 14, the valve 70 being biased towards its closed position by a spring 72. The valve 70 is hollow and has ports 73 that provide communication, through the valve, between the outlet 14 and the pressure-sensing chamber 60, whereby the valve is pressure balanced and the pressure in the chamber 60 follows that of the outlet 14. The preferred arrangement of the valve 70 is illustrated in FIG. 2 and will be described hereinafter.

The valve 70 is actuated by a plunger 74 carried by a diaphragm 75 dividing the chamber 60 from an actuating pressure chamber 76. A spring 77 acts on the diaphragm to oppose its motion towards the valve 70, to allow preloading of the opposite side of the diaphragm with a priming pressure thereby providing the required response characteristic.

The inlet 12 is connected to a port 78 in the wall of bore 71 by a passage 79 that also has a connection 80 leading to a servo pressure chamber 81 via a valve 82 controlled by a diaphragm 83 and spring 84 so as to function as a pressure-reducing valve effective to maintain in the chamber 81 a servo pressure of fixed value.

A torque motor 85 has a valve member 86 movable by the motor 85 between the position illustrated, in which it connects the actuating pressure chamber 76 to a vent 87, and a position in which it restricts the vent 87 and connects the actuating pressure chamber 76 to the servo pressure chamber 81.

An electronic control unit (ECU) generally indicated at 88 controls the functions of the G protection garment control means incorporated in the unit 10. The ECU 88 provides signals to drive the torque motor 85 in response to G-load signals from an accelerometer 99 and in response to other control inputs to be described.

A transducer 89 is disposed to sense pressure in the pressure-sensing chamber 60 and to provide a pressure feedback signal to the ECU 88.

A compensated vent valve 90 controls a vent port 91 in the outlet 14 and is biased towards opening by a spring 92. The valve 90 is actuated by a diaphragm 93 responsive to the actuating pressure in the actuating pressure chamber 76, transmitted via a passage 94, so that the valve 90 is closed when the actuating pressure rises to cause inflation of the G-protection garment. A pressure relief valve 95 serves to relieve excess actuating pressure.

The ECU 88 provides a press-to-test facility 96 and incorporates a cabin pressure sensing transducer 97 and a "ready pressure" switch 98 as well as the accelerometer 99, these items being represented symbolically in the drawing.

In operation of the G-protection garment inflation control system that includes the described control means of the unit 10, conditions such as the sensing of acceleration above a threshold by the accelerometer 99 and/or by other accelerometers (not shown) distributed in the aircraft structure and requiring inflation of the G-protection garment cause the ECU 88 to output a signal to the torque motor 84 to apply an appropriate level of actuating pressure to the diaphragms 75 and 93. The vent valve 90 is thereby closed while the spool valve 70 is moved, to the right as seen in the drawing, to open a flow path from the inflation gas inlet 12 to the outlet 14. The G-protection garment is thereby inflated, the pressure in the garment being sensed by the transducer 89 that provides a feedback signal to the ECU 88 to enable the latter to inflate the garment to and hold it at a pressure appropriate to the conditions, by appropriate adjustment of the torque motor 84.

When a decrease in garment inflation pressure is required, the torque motor 84 is actuated to reduce the actuating pressure in chamber 76: the valve 70 is thereby moved to its closed position while the vent valve 90 is allowed to open by the reduction in actuating pressure applied to the diaphragm 93. This causes deflation of the garment.

The positioning of the feedback transducer 89 in the chamber 60, rather than in the outlet 14 or at some other position in the inflation gas flow path to the latter, provides for accurate pressure sensing unaffected by turbulence or other dynamic gas pressure perturbations due to gas flow at high rates. Accordingly, a very rapid response to demands for garment inflation pressure changes can be provided without risk of "hunting" by the system in finding and holding a demanded inflation pressure. The control of actuating pressure by the torque motor 84 conduces to such a rapid response.

The illustration of the G-protection garment inflation control means in FIG. 1 is partly schematic to facilitate understanding of the principles of the arrangement. In practical embodiments the disposition of the components of these control means is as shown in FIG. 2 that is a sectional view of the relevant part of the unit 10.

In FIG. 2, elements that have been described with reference to FIG. 1 are marked with the same references as in the latter and will not be further described except as to details not shown in FIG. 1.

Thus as shown in FIG. 2, the pressure-balanced spool valve 70 has its spring 72 enclosed in cap 100 supported by a cup spider 101 in the body of the unit, the cap 100 having a telescoping relationship to a tapered sleeve 102 on the end of the valve 70. The purpose of this arrangement is to smooth the flow of inflation gas in its flow path in the vicinity of the end of the valve 70 thereby avoiding irregularities and turbulence caused by gas discharging into an irregular shaped chamber and flowing over an exposed spring 72. The cap 100 has a lateral port 103 providing access to the interior of the valve 70 and thus, through the ports 73, to the pressure-sensing chamber 60. The chamber 60 is thereby isolated from pressure fluctuations due to irregularities in the flow of inflation gas in its flow path immediately downstream of the valve 70.

As shown in both FIGS. 1 and 2, the vent valve 90 is disposed in a lateral port 91 in the body 10 at a point between the valve 70 and the outlet 14, enabling the actuating pressure to be applied to the diaphragm 93 via a short passageway 94 to achieve a rapid response of the valve to changes in actuating pressure, while avoiding the flow of gas from the G-protection garment during deflation thereof passing into or through the valve 70 en route to a vent port, and so minimising the risk of contaminants carried by the gas stream from the garment entering the valve mechanism to interfere with the operation thereof.

FIG. 2 also shows the self-sealing valve arrangement for the outlet 14/inlet 14a combination. As is typical in such arrangements, the valve member 105 is arranged for movement axially of the outlet 14, in this case on a spigot 106 carried by the spider 101, being urged outwardly of the outlet 14 by a spring 107. The valve member 105 and the outlet 14 are shaped to enable the member 105 to close the outlet when the connector 15 is removed. The connector 15 has a corresponding valve member 108 movable in its inlet 14a and biased by a spring 109. The valve members 105, 108 have respective projections 105a, 108a that cooperate when the connector 15 is fitted to the unit 10 to cause the valve members to be pressed back, against the thrusts of the respective springs 107, 109, to open a flow path from the outlet 14 to the inlet 14a.

As noted, the ECU 88 has a "ready pressure" switch 98. The function of this is to cause the ECU to output a signal to the torque motor to apply a "priming pressure" to the G-protection garment, typically about four times the pressure of the breathing gas being delivered by the demand regulator, for the physiological reasons that have been explained, and also thereby to enhance the response of the system to a subsequent demand for garment inflation. The switch 98 would, for instance, be operated by the aircrew in anticipation of high-G manoeuvres.

It will be apparent that the inflation pressure in the G-protection garment that appears in the pressure sensing chamber 60 is also applied to the valve 58 to move this to close the passageway 49 and thereby cause the pressure in chamber 47 to rise to provide increased breathing gas pressure in the breathing mask supplied by the demand regulator of the unit 10, at times when the G-protection garment is inflated in response to conditions requiring this.

As noted, the ECU 88 includes a cabin pressure sensing transducer 97 which senses absolute pressure and provides an input to the ECU so that in the event of the cabin altitude exceeding 12000 meters, the ECU outputs to the torque motor a signal that accounts for the aircraft altitude and provides the necessary G-protection garment inflation (typically four times breathing pressure).

In the event of the aircrew being exposed to both high altitude (typically in excess of 12000 meters) and high G-load (typically in excess of 2G), the ECU signals the higher of the two pressure requirements to be delivered to the G-protection garment.

What is claimed is:

1. An aircraft aircrew life support system comprising a breathing demand regulator means adapted to be connected with a breathing gas source for regulating delivery of breathing gas to a breathing mask in response to breathing demands of the aircrew member, and, if required, to a counter-pressure garment, the demand regulator including a breathing-pressure control chamber fed with gas to develop a control pressure therein determining the breathing gas pressure delivered by the regulator, aneroid means controlling outflow from the control chamber for increasing breathing gas delivery pressure appropriate to positive pressure breathing above a predetermined altitude, and valve means also controlling outflow from the control chamber for increasing breathing gas delivery pressure appropriate to positive pressure breathing in the presence of high or rapidly changing G-load; G-protection garment inflation pressure control means disposed in a common body with said demand regulator means for outputting inflation gas to a G-protection garment and to said valve means controlling outflow from the control chamber of said demand regulator means, said G-protection garment control means comprising a spring-biased pressure-balanced valve adapted to be displaced, against the spring bias, in an opening direction by a pneumatic actuator, the pneumatic actuator being subject to feedback control responding to G-protection garment inflation pressure, wherein the feedback control is by electrical signals derived by a pressure transducer sensing inflation pressure and wherein the pressure transducer senses pressure in a chamber subject to inflation pressure but isolated from the flow of inflation gas whereby turbulence effects tending to degrade pressure signals output by the transducer are avoided and duct means in said common body for ducting inflation gas output by said control means to be applied as in operating force to said valve means whereby breathing gas appropriate to positive pressure is delivered by said demand regulator to the breathing mask in the presence of increasing G-load.

2. A system according to claim 1, further comprising means for smoothing the flow of inflation gas in its flow path adjacent to a connection to said chamber, whereby perturbations in the pressure sensed by the transducer are minimised.

3. A system according to claim 2, wherein said inflation gas flow smoothing means comprise a cap supported by a cup spider in the housing and a tapered sleeve on the end of the balanced valve, the cap and the tapered sleeve having a telescoping relationship to each other and enclosing with the balanced valve the valve biasing spring.

4. A system according to claim 3, further comprising port means in said cap and further port means in said balanced valve whereby inflation pressure is effective in said chamber.

5. A system according to claim 1, wherein the pneumatic actuator comprises a plunger carried by a diaphragm defining one wall of an actuating pressure chamber, and wherein said means responsive to variation in G-load for actuating said pneumatic actuator includes an electrically operated torque motor having a valve member for regulating a servo-flow in obtainment of a servo-pressure in said actuating pressure chamber.

6. A system according to claim 5, wherein the torque motor is connected for receiving control signals from an electronic control unit adapted for processing signals from accelerometer means sensing G-load and pressure transducer means sensing aircraft cabin pressure.

7. A system according to claim 1, wherein said means responsive to variation in G-load for actuating the pneumatic actuator is controlled by signals derived from means sensing G-loads and by signals from said transducer sensing aircraft cabin pressure.

8. A system according to claim 1, wherein a vent valve for releasing inflation gas when deflation of the G-protection garment is required is provided within the common body and connected to the inflation gas flow path downstream of the pressure-balanced valve of the G-protection garment control means so that the pressure-balanced valve is effectively isolated from the flow of inflation gas released by the vent valve, whereby contaminants carried in such gas flow cannot enter the pressure-balanced valve mechanism to interfere therewith.

* * * * *